Aug. 18, 1925.
S. C. BAUGHN
CAR MOVER
Filed June 23, 1923
1,549,850
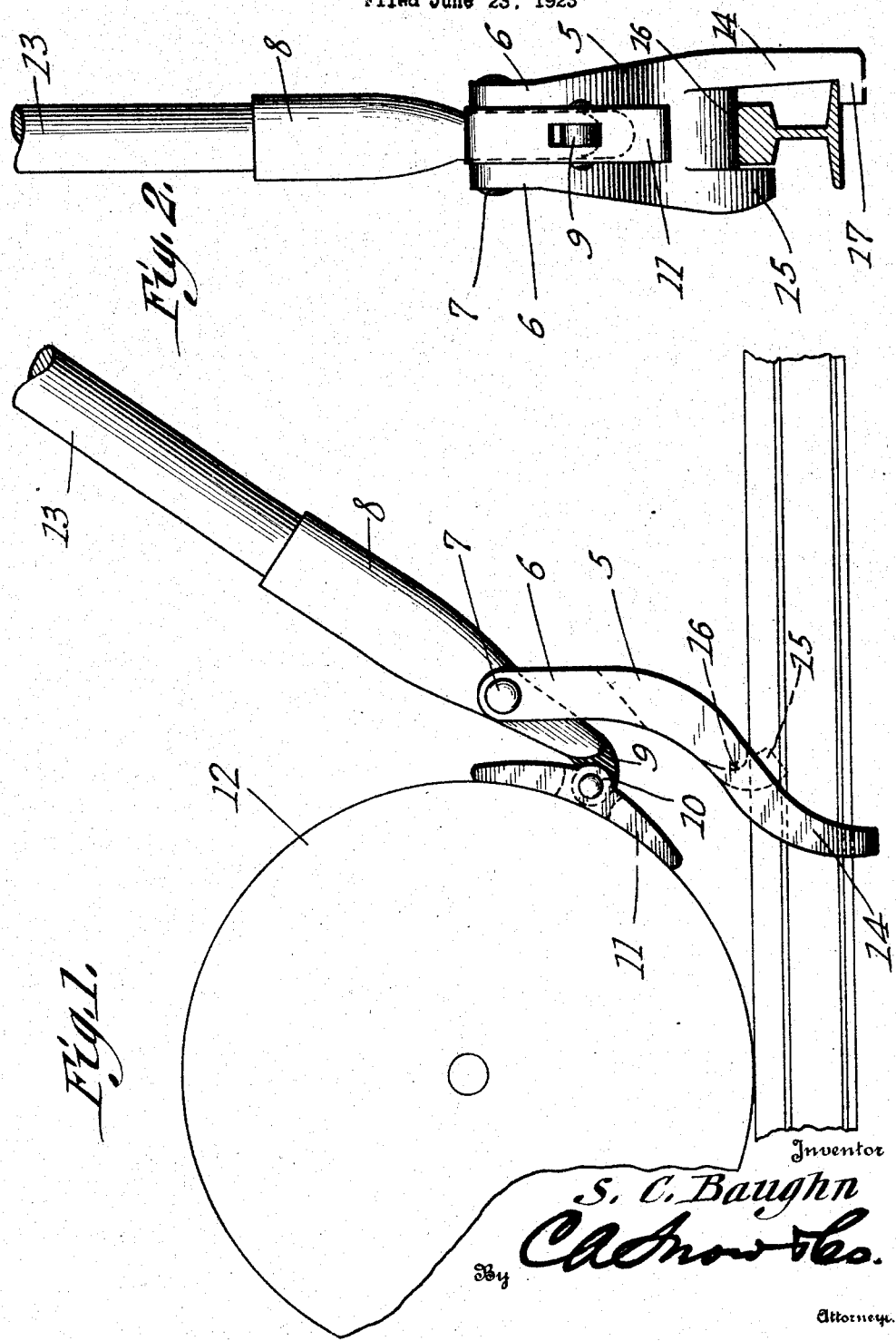
Inventor
S. C. Baughn
By C. A. Snow & Co.
Attorneys.

Patented Aug. 18, 1925.

1,549,850

UNITED STATES PATENT OFFICE.

SAMUEL C. BAUGHN, OF DELTA, MISSOURI, ASSIGNOR OF ONE-HALF TO EDGAR G. HAMMONS, OF POPLAR BLUFF, MISSOURI.

CAR MOVER.

Application filed June 23, 1923. Serial No. 647,362.

*To all whom it may concern:*

Be it known that I, SAMUEL C. BAUGHN, a citizen of the United States, residing at Delta, in the county of Cape Girardeau and State of Missouri, have invented a new and useful Car Mover, of which the following is a specification.

This invention relates to car movers and more particularly car movers wherein a lever is employed for engagement with a car wheel for forcing the car wheel forwardly.

The primary object of the invention is to provide a mover of this type especially designed for use in factories or the like, wherein it is necessary to move a car a short distance by manuel power, novel means being provided for increasing the leverage of the mover to cause the car to be moved with the minimum amount of exertion on the part of the operator.

A further object of the invention is to provide a fulcrum bracket especially designed to grip a rail in a manner to prevent slipping of the device while in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view disclosing the device as positioned on the rail of a track and engaging a car wheel.

Figure 2 is a front elevational view of the mover.

Referring to the drawing in detail, the mover includes a fulcrum bracket indicated generally by the reference character 5 which bracket is formed with spaced upwardly extended arms 6 apertured at their upper ends to accommodate the pin 7 on which the handle socket 8 is mounted.

The handle socket 8 is formed with a reduced forward extremity 9 provided with flattened side faces to move between ears 10 of the thrust block 11, the reduced extremity 9 being curved outwardly so that the thrust block 11 will be supported in such relation with the car wheel engaged thereby and which in the present drawing is indicated at 12, that upon movement of the handle 13, which is positioned in the socket member 8, the thrust block will operate to not only move the wheel associated therewith forwardly, but tend to rotate the same.

The fulcrum bracket 5 is curved forwardly as clearly shown by Figure 1 of the drawing, and is formed with a long arm 14 and a relatively short arm 15, the space between the arms being sufficiently wide to permit the fulcrum bracket to straddle the rail. As shown, the wall of the fulcrum bracket between the arms 14 and 15, is curved as at 16 to permit the fulcrum bracket to rock freely and facilitate the positioning of the device over a rail.

The extremity of the arm 15 is formed at right angles as shown at 17 where the same may position itself under the base of a rail as clearly shown by Figure 2 of the drawings, the curved wall 16 cooperating with the extension 17 to set up a binding action between the fulcrum bracket and the tread and base of a rail.

In order that the lateral movement of the mover may be restricted, the relatively short arm 15 is curved rearwardly so that any tendency of the mover to move laterally towards the inner edge of the rail will be restricted by the curved portion of the arm 15.

In the use of the mover, the fulcrum bracket is positioned over a rail in a manner as shown by the drawing, and the thrust block 11 positioned to engage the wheel of the car to be moved.

The handle 13 is now moved downwardly, a binding action being set up between the curved wall 16 and right angled portion 17 of arm 14, to the end that the bracket is securely held in position, the offset portion of the bracket directing the strain downwardly to the bracket, permitting the handle 13 to move downwardly and the thrust block 11 upwardly against the wheel 12.

The wheel may now be forced forwardly to the end that the car supported by the wheel will move.

What is claimed as new is:—

A car mover including a fulcrum member, an arm formed integral with and extending downwardly from the fulcrum member, said arm having a right angled end portion adapted to fit under the base of a rail, a relatively short arm extending downwardly from the fulcrum member at the opposite side thereof and spaced from the first mentioned arm, the last mentioned arm adapted to lie adjacent to one edge of the tread of the rail, said fulcrum member having a curved surface disposed between the arms, and adapted to rest on the tread of a rail, and means supported at the upper end of the fulcrum member for contacting with the wheel of a car to move the wheel.

In testimony that I claim the foregoing as my own, I have hereto affixed my signature.

SAMUEL C. BAUGHN.